United States Patent Office 3,684,715
Patented Aug. 15, 1972

3,684,715

PIEZOELECTRIC OXIDE MATERIALS

Noboru Ichinose, Harutoshi Egami, Katsunori Yokoyama, and Yohachi Yamashita, Yokohama, Japan, assignors to Tokyo Shibaura Electric Co., Ltd., Kawasaki-shi, Japan Filed Mar. 31, 1971, Ser. No. 129,676
Claims priority, application Japan, Apr. 1, 1970, 45/26,968; Oct. 12, 1970, 45/88,806
Int. Cl. C04b *35/46, 35/48*
U.S. Cl. 252—62.9 2 Claims

ABSTRACT OF THE DISCLOSURE

A basic ternary piezoelectric oxide material consisting of 0.5 to 50 mol percent $Pb(Me_{1/2}Te_{1/2})O_3$ (Me denotes at least one metal selected from the group consisting of Ni, Co and Mn), 30.0 to 60.0 mol percent $PbTiO_3$ and 15.0 to 55.0 mol percent $PbZrO_3$ and another type of piezoelectric oxide material wherein 20.0 atom percent max. of the Pb in said basic ternary oxide piezoelectric material is substituted by at least one metal element selected from the group consisting of Ba, Sr and Ca.

This invention relates to a piezoelectric oxide material, and more particularly to a basic ternary piezoelectric oxide material consisting of $Pb(Me_{1/2}Te_{1/2})O_3$ (where Me represents at least one metal selected from the group of Co, Ni and Mn, hereinafter referred to as "Me:Ni, Co or Mn")—$PbTiO_3$—$PbZrO_3$ prepared by solid phase reaction from a plurality of oxides having different valences and another type of ternary piezoelectric oxide material wherein part of the Pb included in said basic ternary piezoelectric oxide material is substituted by at least one metal element selected from the group consisting of Ba, Sr and Ca.

It is well known that piezoelectric materials are widely used as an ultrasonic vibrating element, transducer element, for example, of a mechanical filter, ceramic filter element, elements of, for example, pickups, microphones and vibrators and further as an element for igniting, for example, gas implements. For such applications, there has heretofore been developed an improved form of binary piezoelectric oxide material of $PbTiO_3$—$PbZrO_3$ (having a substantially equal mol percent). There has been proposed a binary piezoelectric oxide material improved by adding, for example, CdO or ZnO. However said prior art piezoelectric material is found to have the disadvantages of an electro-mechanical coupling coefficient $Kp$ of only 37 to 48% and its piezoelectric properties vary with time and temperature. There has also been published a ternary piezoelectric oxide composition of $PbTiO_3$—$PbZrO_3$—$Pb(Mg_{1/3}Nb_{2/3})O_3$. This product generally has an electro-mechanical coupling coefficient of about 50% at most and a mechanical quality factor $Qm$ pf. about 600 max. Where the mechanical qulity factor $Qm$ indicates 568, the electro-mechanical coupling coefficient $Kp$ stands at 7.5%. For practical application, however, piezoelectric materials are demanded to have as high an electro-mechanical coupling coefficient as possible.

When the piezoelectric material is subjected after polarization to a great mechanical pressure across both poles, it is known to generate high voltage. Accordingly, it is used in various applications, for example, the production of spark discharges across both poles utilizing said voltage.

The properties of the piezoelectric material adapted for such applications are evaluated by various constants (for example, the electro-mechanical coupling coefficient and output voltage coefficient) generally used with such material. However, when a large mechanical pressure is applied, there generally results a lowering of output voltage (or loss of an electro-mechanical coupling coefficient $K_{33}$). This raises an important practical problem. Accordingly, there should be given consideration not only to the aforementioned constants but also to the decrease of said electro-mechanical coupling coefficient upon application of pressure. In fact, the deterioration in properties occurs not only in the electro-mechanical properties due to application of pressure, but also in the purely electrical properties of, for example, ultrasonic vibrating elements and piezoelectric transformer elements.

An object of this invention is to provide a very stable piezoelectric material whose piezoelectrical properties are minimally affected even when said material is repeatedly operated at a pressure of about 100 to 2000 kg./cm.$^2$, thereby maintaining a capacity to generate desired high voltage.

Another object of the invention is to provide a piezoelectric material adapted for generation of spark discharges in igniting gas implements and small capacity engines. According to the present invention there is provided ternary piezoelectric oxide materials having a composition expressed as $$XPb(Me_{1/2}Te_{1/2})O_3—YPbTiO_3—ZPbZrO_3$$

where:

Me=at least one metal selected from the group of Ni, Co and Mn
X=0.5 to 50.0
Y=30.0 to 60.0
Z=15.0 to 55.0
X+Y+Z=100 mol percent The present invention can be more fully understood from the following detailed description when taken in connection with reference to the accompanying drawings, in which.

Figure 5:
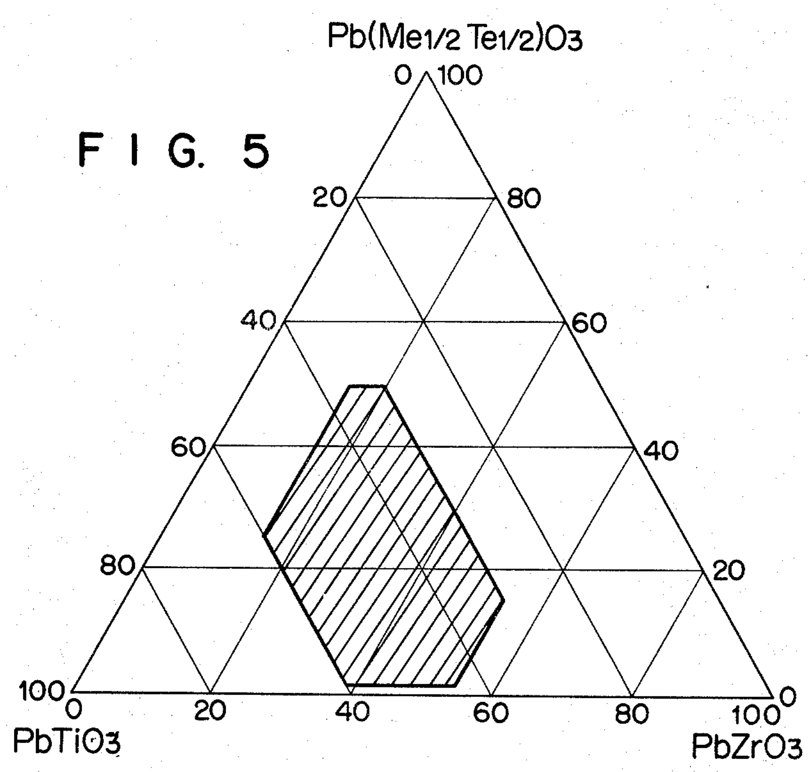
Figure 6:
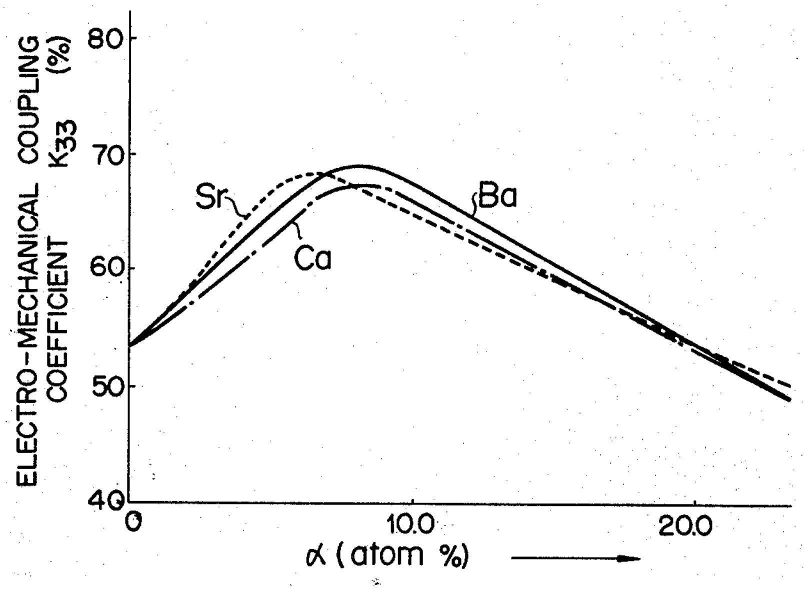
Figure 7:
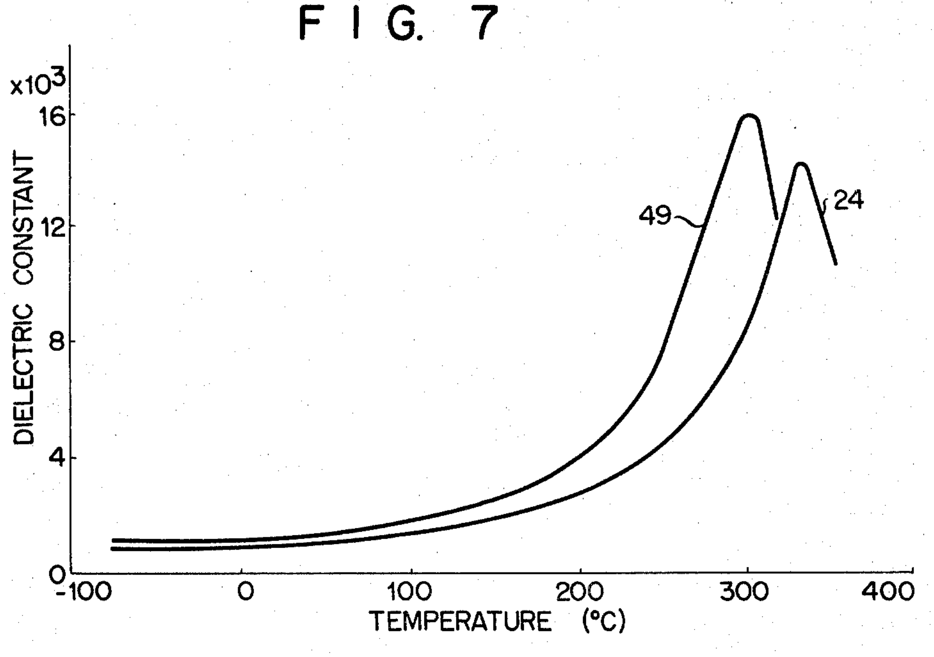
Figure 8:
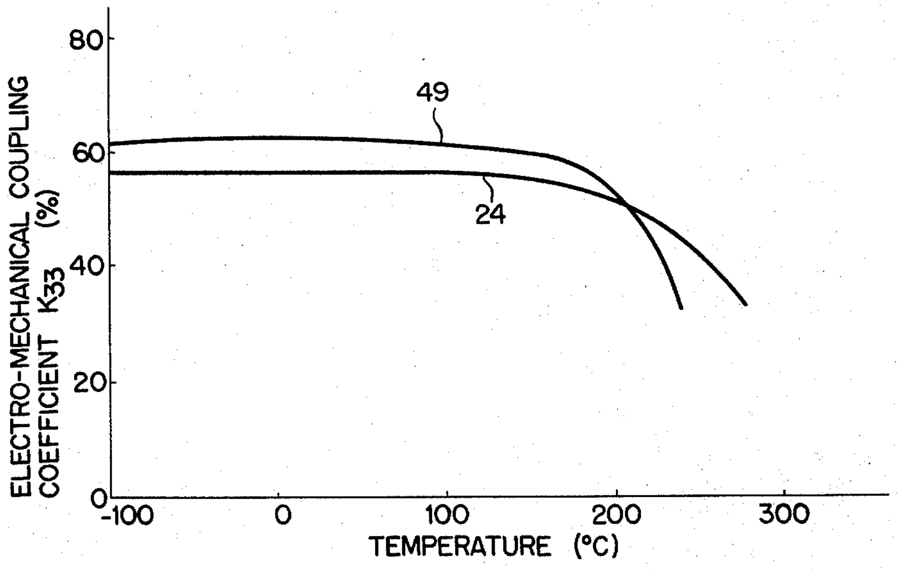
Figure 9:
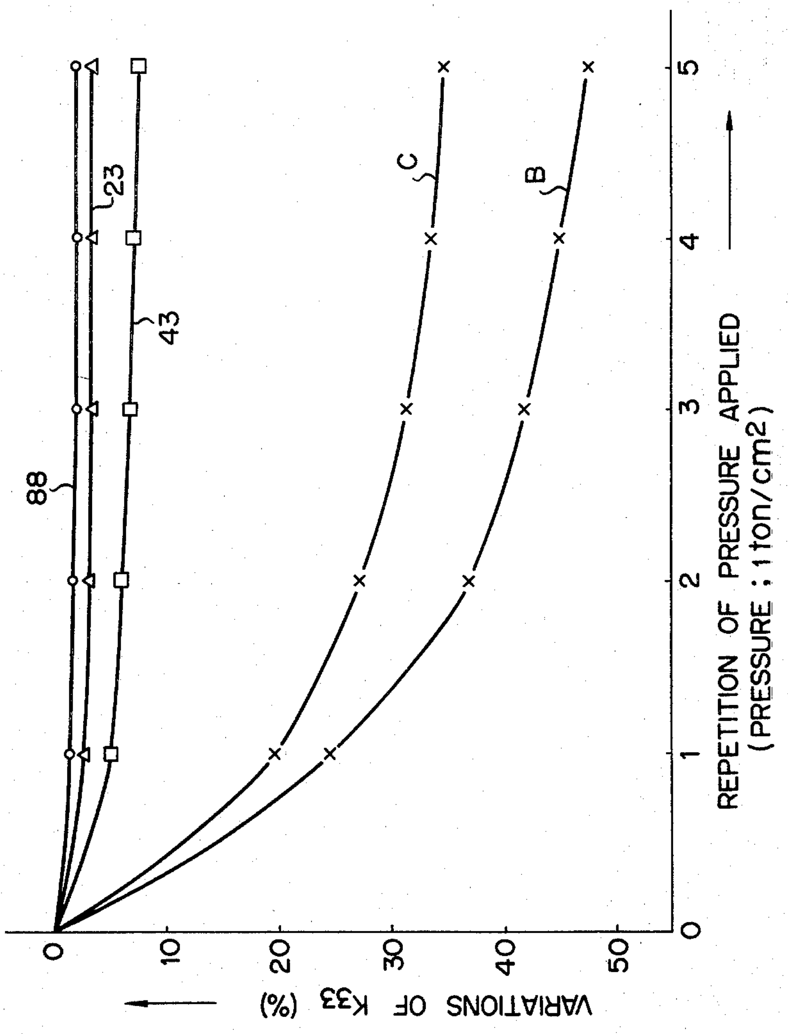
Figure 10:
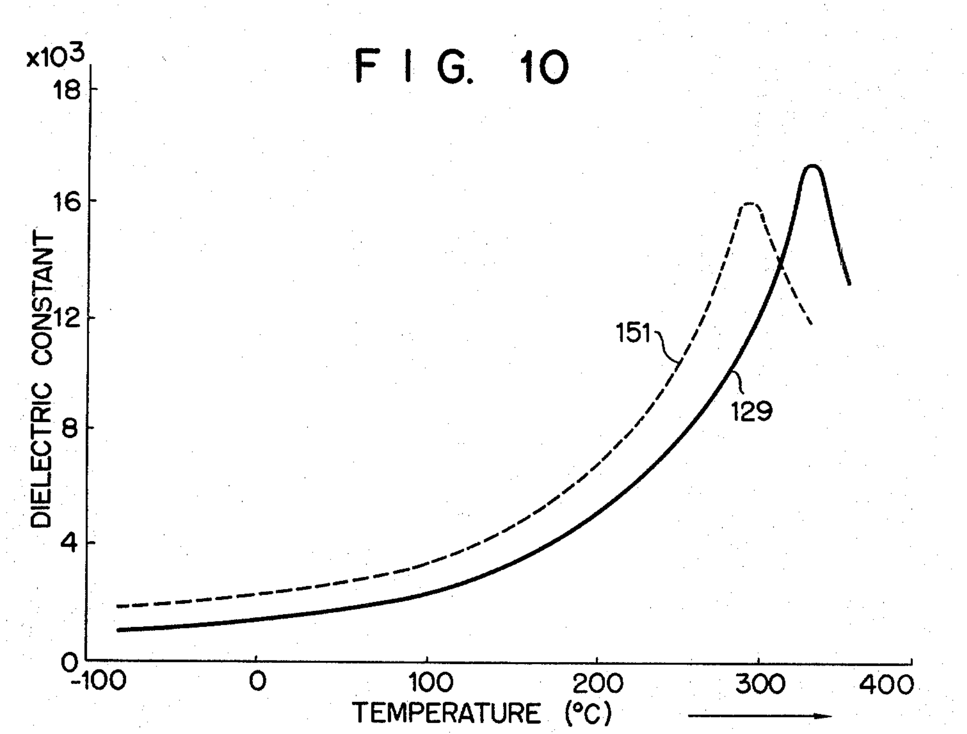
Figure 11:
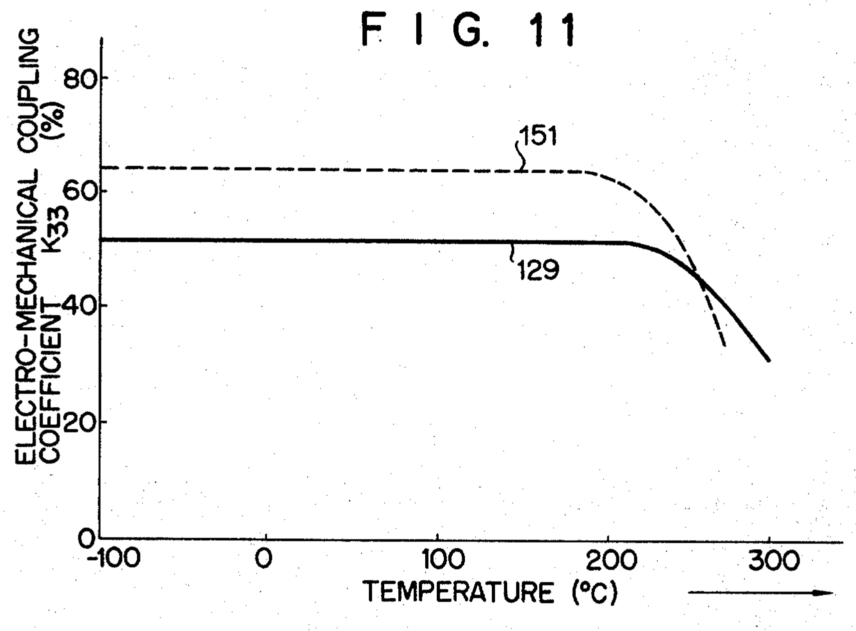
Figure 12:
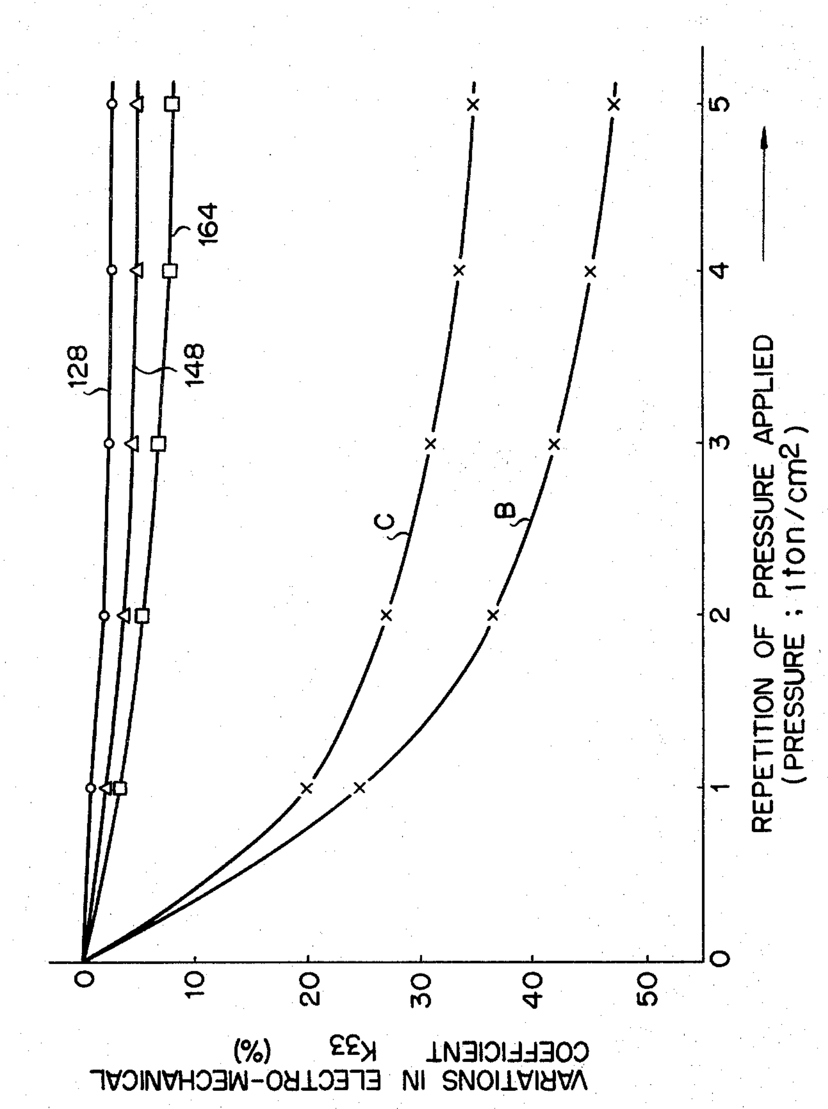

(Me:Ni, Co or Mn) fixed and the proportions of the other components $PbTiO_3$ and $PbZrO_3$ changed;

FIG. 5 is a triangular chart indicating the specified composition range of a basic ternary piezoelectric oxide material of the invention;

FIG. 6 is a curve diagram showing variations in the electro-mechanical coupling coefficient $K_{33}$ of a basic ternary piezoelectric oxide material of the invention wherein part of the Pb included therein is substituted by different amounts of Ba, Sr and Ca respectively;

FIG. 7 is a curve diagram showing the temperature characteristics of the dielectric constant of two basic ternary piezoelectric oxide materials of the invention;

FIG. 8 is a curve diagram showing the temperature characteristics of the electro-mechanical coupling coefficient $K_{33}$ of the two piezoelectric materials of FIG. 7;

FIG. 9 is a curve diagram showing varying degrees of deterioration occurring in the electro-mechanical coupling coefficient $K_{33}$ according to the frequency of applied compressing pressure as compared with the other three basic ternary piezoelectric oxide materials of the invention and with the prior art piezoelectric materials;

FIG. 10 is a curve diagram showing the temperature characteristics of the dielectric constant as compared with a basic ternary piezoelectric oxide material of the invention wherein part of the Pb included therein is substituted by Ba and another basic ternary piezoelectric oxide material of the invention wherein part of the Pb included therein is substituted by Sr;

FIG. 11 is a curve diagram showing the temperature characteristics of the electro-mechanical coupling coefficient $K_{33}$ of the piezoelectric materials of the invention of FIG. 10;

FIG. 12 is a curve diagram showing varying degrees of deterioration occurring in the electro-mechanical coupling coefficient $K_{33}$ according to the frequency of applied compressing pressure as compared with three other basic ternary piezoelectric oxide materials of the invention wherein part of the Pb included therein is substituted by Sr+Ca, Sr and Sr respectively and with two prior art piezoelectric materials.

This invention is further described by reference to the appended drawings. The piezoelectric oxide materials of the invention are prepared by solid reaction from a plurality of oxides having different valences whose basic composition consists of a ternary piezoelectric oxide system $XPb(Me_{1/2}Te_{1/2})O_3—YPbTiO_3—ZPbZrO_3$ obtained by substituting part of a binary system $PbTiO_3—PbZrO_3$ with a component $Pb(Me_{1/2}Te_{1/2})O_3$ having a perovskite structure. It will be noted that Me represents at least one metal selected from the group of Ni, Co and Mn and that X denotes 0.5 to 50.0 mol percent, Y 30.0 to 60.0 mol percent and Z 15.0 to 55.0 mol percent (X, Y and Z are so designed as to total 100 mol percent). This invention includes a piezoelectric material obtained by substituting up to 20.0 atom percent of the Pb included in the aforementioned basic piezoelectric composition with at least one metal selected from the group of Ba, Sr and Ca. With Ba, Sr and Ca collectively represented by Me′, a general formula including Me′ may be expressed as $$Pb_{1-\alpha}Me'_{\alpha}[(Me_{1/2}Te_{1/2})_xTi_yZ_z]O_3$$

The substituted amount $\alpha$ of Pb denotes up to 20.0 atom percent max. The materials represented by Me and Me′ are hereinafter referred to as "Me:Ni, Co or Mn" and "Me′:Ba, Sr or Ca" respectively.

The piezoelectric oxide material of this invention can generally be easily manufactured by the technique of powder metallurgy. Raw oxide materials, for example, PbO, Me′O, $TiO_2$, $ZrO_2$, $TeO_3$ and MeO (Me:Ni, Co or Mn) are accurately weighed out in a prescribed ratio. These raw materials are thoroughly mixed in a ball mill. Said raw materials may consist of compounds thermally converted to oxides such as hydroxides, carbonates or oxalates. The mixture is preheated to a temperature of, for example 600° C. to 900° C., and then pulverized in a ball mill to form powders controlled to a particle size of 1 to 2 microns. The powders are mixed with a binding agent such as water or polyvinyl alcohol. After being molded at a pressure of about 0.5 to 2 ton/cm.², the mass is baked at a temperature of 1000° to 1270° C. Since part of the PbO which constitutes one component of the basic ternary piezoelectric oxide composition is likely to be evaporated off, said baking is performed in a closed furnace. The mass should be kept at a maximum temperature for a period of between 0.5 to 3 hours. A pair of electrodes is applied to both sides of the molded and sintered oxide mixture and a D.C. voltage having a field intensity of 20 to 30 kv./cm. is applied for about one hour in silicone oil at a temperature of 140° to 160° C. to polarize the mass.

The proportions of the components $Pb(Me_{1/2}Te_{1/2})O_3$ (Me:Ni, Co or Mn), $PbTiO_3$ and $PbSrO_3$ of the basic ternary piezoelectric oxide materials of this invention are defined within the aforementioned range for the following reason. A content of $Pb(Me_{1/2}Te_{1/2})O_3$ larger than 50.0 mol percent or smaller than 0.5 mol percent fails to produce a piezoelectric material with the required 50% electro-mechanical coupling coefficient for piezoelectric ignition. When a determination was made of the electro-mechanical coupling coefficient $K_{33}$ of a piezoelectric oxide material by varying the proportions of $$Pb(Me_{1/2}Te_{1/2})O_3$$

Figure 1:
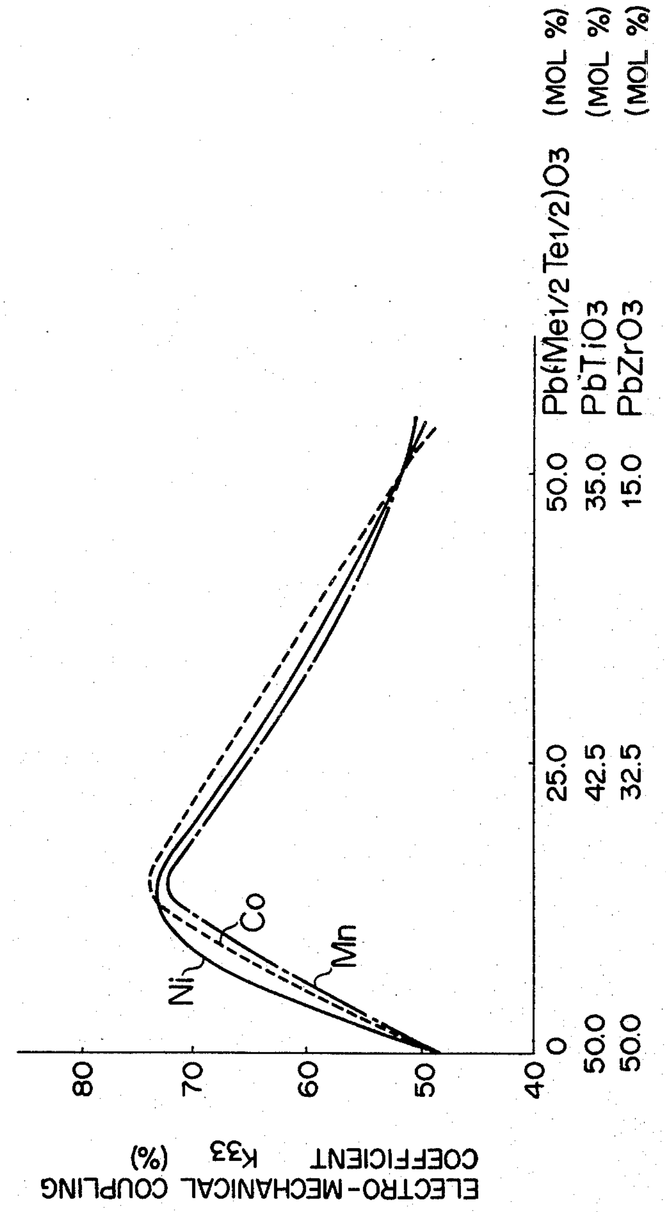
FIG. 1 is a curve diagram showing variations in the electro-mechanical coupling coefficient $K_{33}$ of three basic ternary piezoelectric oxide materials of this invention where their compositions are varied.

(Me:Ni, Co or Mn), $PbTiO_3$ and $PbZrO_3$, the curves were obtained of FIG. 1. An amount of $Pb(Me_{1/2}Te_{1/2})O_3$ outside of the range of 0.5 to 50.0 mol percent did not give desired piezoelectric properties in any case. FIG. 1 is a curve diagram of a piezoelectric oxide material according to this invention wherein there were respectively used Ni, Co and Mn represented by Me.

Figure 2:
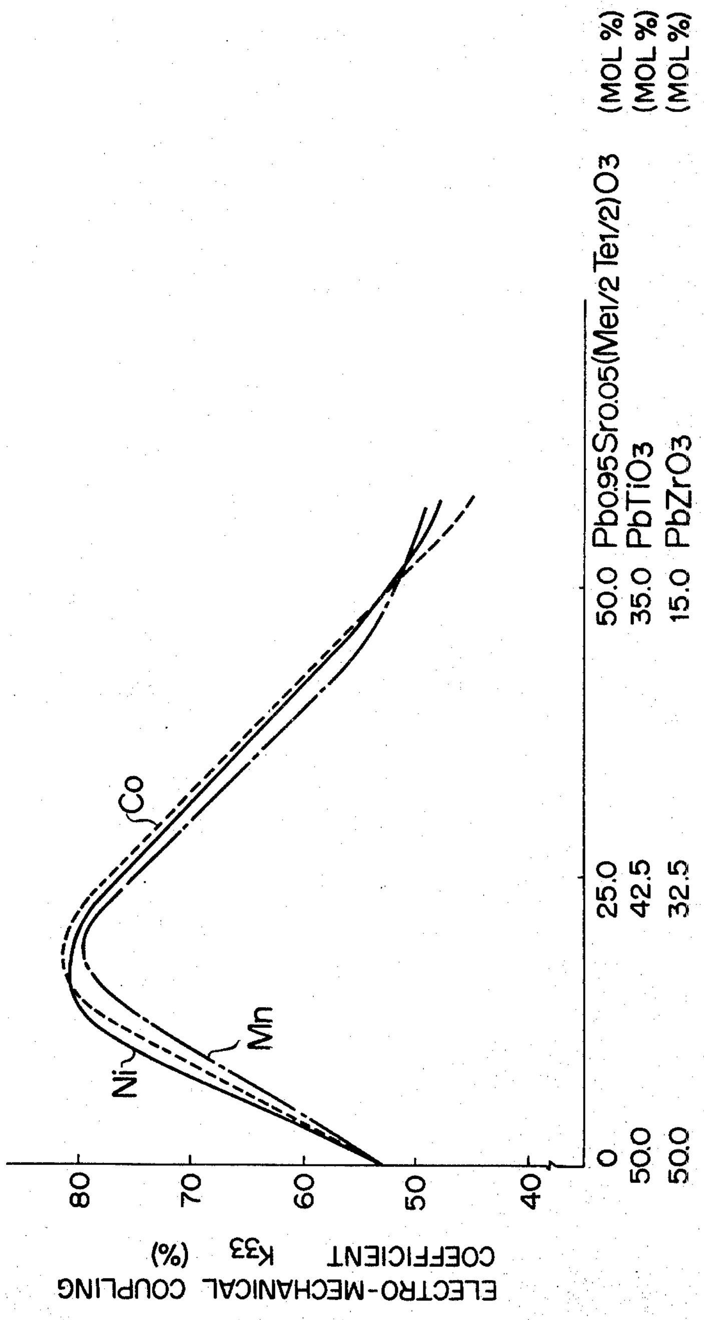
FIG. 2 is a curve diagram showing variations in the electro-mechanical coupling coefficient $K_{33}$ of other three basic ternary piezoelectric oxide materials of the invention wherein part of the Pb included therein is substituted by Sr.

When a determination was made of the electro-mechanical coupling coefficient of a piezoelectric material containing $PbO_{0.95}SrO_{0.05}[(Me_{1/2}Te_{1/2})_xTi_yZr_z]O_3$ by varying the values of $x$, $y$ and $z$, the curves of FIG. 2 were obtained. An amount of $Pb(Me_{1/2}Te_{1/2})O_3$ (Me:Ni, co or Mn) outside the range of 0.5 to 50.0 mol percent could not provide desired piezoelectric properties in any case. The curves Ni, Co and Mn of FIG. 2 illustrate the properties of a piezoelectric material wherein there were respectively used Ni, Co and Mn represented by Me.

Figure 3:
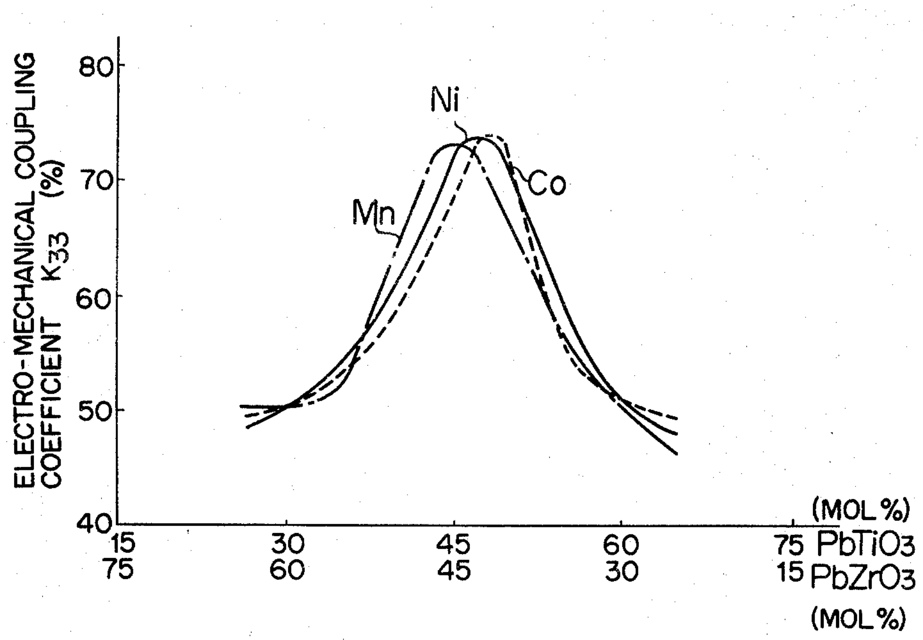
FIG. 3 is a curve diagram showing variations in the electro-mechanical coupling coefficient $K_{33}$ of three basic ternary piezoelectric oxide materials of the invention with the proportion of one component $Pb(Me_{1/2}Te_{1/2})O_3$ (Me:Ni, Co or Mn) fixed and the proportions of the other components $PbTiO_3$ and $PbZrO_3$ changed.

The reason why the amount of $PbTiO_3$ is selected from the range of 30.0 to 60.0 mol percent is that when used in an amount outside of said range a piezoelectric material having a large electro-mechanical coupling coefficient $K_{33}$ was not produced. When a determination was made of the properties of a piezoelectric oxide material with the proportion of $Pb(Me_{1/2}Te_{1/2})O_3$ (Me:Ni, Co or Mn) fixed at 13 mol percent and the proportions of $PbTiO_3$ and $PbZrO_3$ varied, the curves of FIG. 3 were obtained. The curves Ni, Co and Mn of FIG. 3 denote the cases where there were respectively used Ni, Co and Mn represented by Me shown in $Pb(Me_{1/2}Te_{1/2})O_3$.

Figure 4:
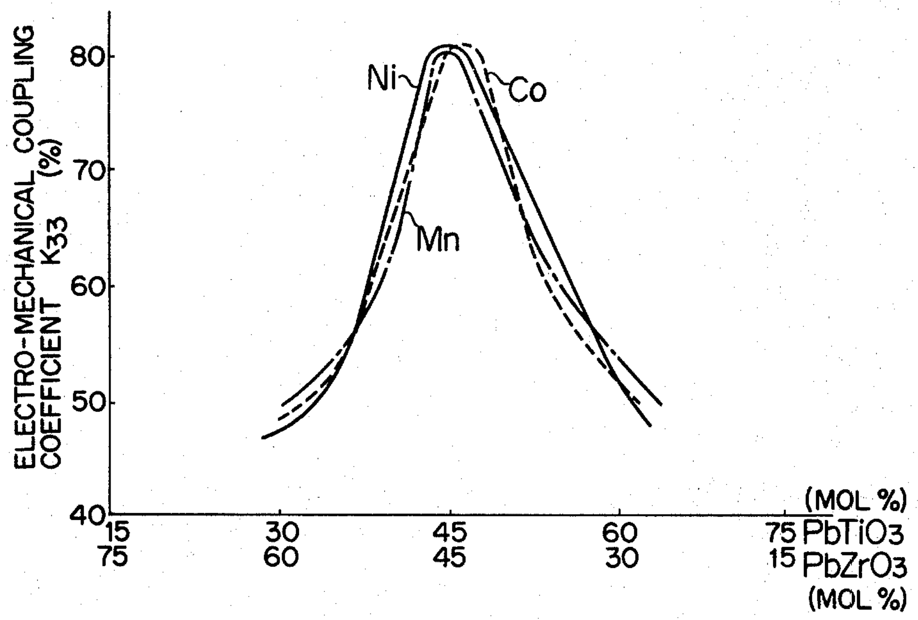
FIG. 4 is a curve diagram showing viariations in the electro-mechanical coupling coefficient $K_{33}$ of three basic ternary piezoelectric oxide materials of the invention wherein part of the Pb included therein is substituted by Ba with the proportion of one component $$Pb(Me_{1/2}Te_{1/2})O_3$$

When a determination was made of the properties of a piezoelectric oxide material containing $$Pb_{0.94}Ba_{0.06}[(Me_{1/2}Te_{1/2})_{0.1}Ti_yZr_z]O_3$$

by varying the values of $y$ and $z$, the curves of FIG. 4 were obtained. The curves Ni, Co and Mn of FIG. 4 indicate the properties of a piezoelectric material wherein there were respectively used Ni, Co and Mn represented by Me given in the above formula.

As is apparent from FIGS. 2 and 4, an amount of $PbTiO_3$ smaller than 30.0 mol percent did not provide the desired piezoelectric properties. Where the proportion of said $PbTiO_3$ increases over 60.0 mol percent, there was not obtained a piezoelectric material having desired properties or one which was satisfactory in respect of stability, though it did not raise any problem with its piezoelectric properties. Accordingly, the proportion of $PbTiO_3$ should be limited to the aforesaid range.

The remaining component $PbZrO_3$ of the basic ternary piezoelectric oxide composition $$Pb(Me_{1/2}Te_{1/2})O_3—PbTiO_3—PbZrO_3$$

should be selected from the range of 15.0 to 55.0 mol percent in order to enable said composition to display desired properties. Thus the proportions of all the components of the basic ternary piezoelectric oxide material of this invention should be defined within the hatched region of FIG. 5.

The reason why a maximum of 20 atom percent of Pb maybe substituted by at least one of the group of Ba, Sr and Ca is that if more than 20 atom percent of Pb is substituted, there will not be obtained a product having a large electro-mechanical coupling coefficient $K_{33}$. When a determination was made of the electro-mechanical coupling coefficient $K_{33}$ of a piezoelectric material containing $Pb_{1-\alpha}Me'_{\alpha}[(Ni_{1/2}Te_{1/2})_{0.09}Ti_{0.51}Zr_{0.40}]O_3$ (Me':Ba, Sr or Ca) by varying the values of $\alpha$, the curves of FIG. 6 were obtained. The curves Ba, Sr and Ca of FIG. 6 denote the cases where there were respectively used Ba, Sr and Ca represented by Me'. As seen from FIG. 6, the amount of Pb to be substituted by Ba, Sr or Ca is limited to 20.0 a maximum of atom percent.

Further, the component $Pb(Me_{1/2}Te_{1/2})O_3$ (Me:Ni, Co or Mn) concurrently acts as mineralizer to facilitate sintering. This eventually reduces sintering temperature and prevents PbO, a part of the piezoelectric composition, from being evaporated off, thereby permitting the easy manufacture of a dense piezoelectric material.

The piezoelectric oxide material of this invention is a uniform solid solution of its main components PbO, $TiO_2$, $ZrO_2$, $TeO_3$, MeO and Me'O having the so-called perovskite structure (as confirmed by X-ray analysis). If the composition of a piezoelectric material of this invention is expressed by a general formula $UVO_3$, it will be found to consist of a plurality of elements having different valences, as U denotes divalent Pb and Me'O (Me':Ba, Sr or Ca), and V divalent Me (Me:Ni, Co or Mn), hexavalent Te and tetravalent Ti and Zr. Therefore the piezoelectric composition of this invention is essentially different from that of the prior art product mainly consisting of octahedral oxygen wherein, if said composition is expressed by $U'V'O_3$, U' represents divalent elements and V' tetravalent elements or U' denotes monovalent elements and V' pentavalent elements, namely, U' and V' respectively consist of elements having the same valences. As described above, the piezoelectric oxide material of this invention is fundamentally different from the known type, that is, it has excellent piezoelectric properties which are minimally affected by time and temperature.

Thus when a determination was made of variations in the voltage generated by impact in the piezoelectric material of this invention used as an ignition element, the voltage generation decreased only about 3% after a million impacts in contrast to as large a voltage decrease as 15% occurring in the known piezoelectric material of $PbTiO_3$—$PbZrO_3$ system under the same condition. This reduction in the voltage generation observed in the durability test conducted on the ignition element eventually means a decrease in the reliability with which ignition is effected. Viewed this way, the piezoelectric material of this invention may be considered extremely advantageous.

This invention will be more fully understood by reference to the examples which follow.

(I) Examples of basic piezoelectric oxide materials of this invention.

There were accurately weighed out the prescribed proportions of PbO, $TiO_2$, SrO, $TeO_3$ and MeO (Me:Ni, Co or Mn) having a chemical purity of 98% min. so as to obtain a composition of 1.0 to 55 mol percent $$Pb(Me_{1/2}Te_{1/2})O_3$$

—29 to 61 mol percent $PbTiO_3$—14 to 56 mol percent $PbZrO_3$. These oxides were thoroughly mixed in a ball mill and preheated at a temperature of 850° C. The mass was pulverized into powders controlled in particle size, obtaining 105 samples. There were separately provided 8 powder samples of the prior art. To all these 113 samples were added a binding agent of polyvinyl alcohol. The samples were molded at a pressure of 1 ton/cm.$^2$ and sintered one hour at a temperature of 1000° to 1280° C., obtaining discs 1 mm. thick and 13 mm. in diameter and rods 15 mm. long and 7 mm. in diameter.

The specific gravity of the discs obtained was measured. The dielectric properties of the discs and rods were determined by fitting electrodes thereto. Further, said discs and rods were impressed one hour with voltage having a D.C. field intensity of 30 kv./cm. in silicone oil at a temperature of 140° C. for polarization and thereafter they were tested for piezoelectric properties according to the standard method set forth in the Proc, IRE, vol. 137, 1378–1395, 1949. The results of all these determinations are presented in Table 1 below together with the compositions of the sintered samples. Referring to Table 1, the reference character F.T. represents sintering temperature (° C.), D density at 23° C., $\epsilon$ dielectric constant (1 kHz. at 23° C.), and $K_{33}$ electro-mechanical coupling coefficient (percent). The table also presents the deterioration of $K_{33}$ resulting from a million impacts (percent decrease specified in last column).

TABLE 1

| | $Pb[(Me_{1/2}Te_{1/2})_xTi_yZr_z]O_3$ | | | | | | | |
|---|---|---|---|---|---|---|---|---|
| Sample | X (mol percent) | Y (mol percent) | Z (mol percent) | F. T. | D | $\epsilon$ | $K_{33}$ (percent) | Decrease of $K_{33}$ (percent) |
| Reference: | | | | | | | | |
| 1 | 0 | 61.0 | 39.0 | 1,280 | 7.40 | 851 | 43.2 | 22.3 |
| 2 | Me:Ni, 10.0 | 61.0 | 29.0 | 1,260 | 7.43 | 912 | 49.4 | 10.6 |
| 3 | Me:Co, 20.0 | 61.0 | 19.0 | 1,250 | 7.46 | 883 | 48.8 | 9.7 |
| 4 | Me:Mn, 25.0 | 61.0 | 14.0 | 1,230 | 7.50 | 848 | 46.8 | 12.5 |
| 5 | Me:Ni, 0.4 | 61.0 | 38.6 | 1,270 | 7.51 | 896 | 49.7 | 9.4 |
| Example: | | | | | | | | |
| 1 | Me:Ni, 0.5 | 60.0 | 39.5 | 1,260 | 7.52 | 900 | 50.8 | 3.1 |
| 2 | Me:Co, 0.5 | 60.0 | 39.5 | 1,260 | 7.51 | 917 | 51.0 | 3.5 |
| 3 | Me:Mn, 0.5 | 60.0 | 39.5 | 1,260 | 7.53 | 945 | 50.1 | 2.9 |
| 4 | Me:Ni, 5.0 | 60.0 | 35.0 | 1,240 | 7.58 | 964 | 54.9 | 3.7 |
| 5 | Me:Co, 5.0 | 60.0 | 35.0 | 1,240 | 7.55 | 971 | 55.0 | 3.4 |
| 6 | Me:Mn, 5.0 | 60.0 | 35.0 | 1,240 | 7.56 | 983 | 54.3 | 3.2 |
| 7 | Me:Ni, 13.0 | 60.0 | 27.0 | 1,230 | 7.59 | 994 | 57.2 | 3.8 |
| 8 | Me:Co, 13.0 | 60.0 | 27.0 | 1,230 | 7.57 | 979 | 56.1 | 3.9 |
| 9 | Me:Mn, 13.0 | 60.0 | 27.0 | 1,230 | 7.58 | 1,001 | 55.6 | 4.0 |
| 10 | Me:Ni, 18.0 | 60.0 | 22.0 | 1,220 | 7.60 | 1,026 | 55.3 | 3.3 |
| 11 | Me:Co, 18.0 | 60.0 | 22.0 | 1,220 | 7.60 | 1,034 | 54.4 | 3.0 |
| 12 | Me:Mn, 18.0 | 60.0 | 22.0 | 1,220 | 7.59 | 1,052 | 53.6 | 2.7 |
| 13 | Me:Ni, 25.0 | 60.0 | 15.0 | 1,200 | 7.56 | 976 | 51.0 | 2.5 |
| 14 | Me:Co, 25.0 | 60.0 | 15.0 | 1,200 | 7.54 | 943 | 50.7 | 2.3 |
| 15 | Me:Mn, 25.0 | 60.0 | 15.0 | 1,200 | 7.55 | 980 | 50.5 | 1.8 |
| 16 | Me:Ni, 10.0; Me:Co, 15.0 | 60.0 | 15.0 | 1,200 | 7.57 | 987 | 51.2 | 2.1 |
| 17 | Me:Ni, 15.0; Me:Mn, 10.0 | 60.0 | 15.0 | 1,200 | 7.56 | 1,013 | 52.0 | 2.6 |
| 18 | Me:Ni, 0.5 | 52.0 | 47.5 | 1,240 | 7.54 | 915 | 52.7 | 2.5 |
| 19 | Me:Co, 0.5 | 52.0 | 47.5 | 1,240 | 7.53 | 926 | 51.8 | 2.4 |
| 20 | Me:Mn, 0.5 | 52.0 | 47.5 | 1,240 | 7.55 | 941 | 50.9 | 1.5 |
| 21 | Me:Ni, 7.0 | 52.0 | 41.0 | 1,220 | 7.58 | 963 | 54.8 | 2.8 |
| 22 | Me:Co, 7.0 | 52.0 | 41.0 | 1,220 | 7.57 | 981 | 53.9 | 2.7 |
| 23 | Me:Mn, 7.0 | 52.0 | 41.0 | 1,220 | 7.58 | 994 | 53.8 | 2.0 |
| 24 | Me:Ni, 15.0 | 52.0 | 33.0 | 1,200 | 7.61 | 1,082 | 56.3 | 3.0 |

TABLE 1—Continued

| Sample | Pb[(Me½Te½)xTiyZrz]O3 X (mol percent) | Y (mol percent) | Z (mol percent) | F. T. | D | ε | $K_{33}$ (percent) | Decrease of $K_{33}$ (percent) |
|---|---|---|---|---|---|---|---|---|
| 25 | Me:Co, 15.0 | 52.0 | 33.0 | 1,200 | 7.60 | 1,134 | 55.7 | 2.9 |
| 26 | Me:Mn, 15.0 | 52.0 | 33.0 | 1,200 | 7.60 | 1,192 | 55.5 | 2.6 |
| 27 | Me:Ni, 20.0 | 52.0 | 28.0 | 1,180 | 7.63 | 1,205 | 54.0 | 2.8 |
| 28 | Me:Co, 20.0 | 52.0 | 28.0 | 1,180 | 7.62 | 1,196 | 53.8 | 2.5 |
| 29 | Me:Mn, 20.0 | 52.0 | 28.0 | 1,180 | 7.64 | 1,213 | 53.6 | 2.1 |
| 30 | Me;Ni, 28.0 | 52.0 | 20.0 | 1,160 | 7.59 | 1,110 | 52.4 | 2.2 |
| 31 | Me:Co, 28.0 | 52.0 | 20.0 | 1,160 | 7.58 | 1,170 | 53.2 | 2.0 |
| 32 | Me:Mn, 28.0 | 52.0 | 20.0 | 1,160 | 7.57 | 1,172 | 53.0 | 1.8 |
| 33 | Me:Ni, 33.0 | 52.0 | 15.0 | 1,140 | 7.55 | 1,041 | 51.1 | 1.9 |
| 34 | Me:Co, 33.0 | 52.0 | 15.0 | 1,140 | 7.53 | 1,064 | 50.7 | 1.5 |
| 35 | Me:Mn, 33.0 | 52.0 | 15.0 | 1,140 | 7.56 | 1,100 | 50.5 | 1.4 |
| 36 | Me:Ni, 10.0<br>Me:Co, 10.0<br>Me:Mn, 13.0 | 52.0 | 15.0 | 1,140 | 7.58 | 1,126 | 51.5 | 2.0 |
| 37 | Me:Ni, 0.5 | 46.0 | 53.5 | 1,220 | 7.58 | 1,003 | 52.0 | 2.5 |
| 38 | Me:Co, 0.5 | 46.0 | 53.5 | 1,220 | 7.56 | 1,015 | 51.9 | 2.4 |
| 39 | Me:Mn, 0.5 | 46.0 | 53.5 | 1,220 | 7.57 | 1,034 | 51.0 | 2.1 |
| 40 | Me:Ni, 7.0 | 46.0 | 47.0 | 1,200 | 7.63 | 1,176 | 61.5 | 3.0 |
| 41 | Me:Co, 7.0 | 46.0 | 47.0 | 1,200 | 7.61 | 1,189 | 62.4 | 3.1 |
| 42 | Me:Mn, 7.0 | 46.0 | 47.0 | 1,200 | 7.62 | 1,200 | 60.8 | 2.9 |
| 43 | Me:Ni, 15.0 | 46.0 | 39.0 | 1,180 | 7.65 | 1,291 | 72.1 | 3.8 |
| 44 | Me:Co, 15.0 | 46.0 | 39.0 | 1,180 | 7.70 | 1,324 | 73.5 | 4.0 |
| 45 | Me:Mn, 15.0 | 46.0 | 39.0 | 1,180 | 7.68 | 1,365 | 72.4 | 3.3 |
| 46 | Me:Ni, 5.0<br>Me:Co, 5.0<br>Me:Mn, 5.0 | 46.0 | 39.0 | 1,180 | 7.70 | 1,382 | 74.0 | 3.9 |
| 47 | Me:Ni, 25.0 | 46.0 | 29.0 | 1,140 | 7.61 | 1,206 | 62.1 | 2.7 |
| 48 | Me:Co, 25.0 | 46.0 | 29.0 | 1,140 | 7.60 | 1,213 | 63.0 | 2.9 |
| 49 | Me:Mn, 25.0 | 46.0 | 29.0 | 1,140 | 7.59 | 1,265 | 61.8 | 2.5 |
| 50 | Me:Ni, 33.0 | 46.0 | 21.0 | 1,120 | 7.55 | 1,172 | 58.3 | 2.2 |
| 51 | Me:Co, 33.0 | 46.0 | 21.0 | 1,120 | 7.65 | 1,144 | 57.6 | 2.3 |
| 52 | Me:Mn, 33.0 | 46.0 | 21.0 | 1,120 | 7.54 | 1,180 | 57.2 | 2.0 |
| 53 | Me:Ni, 39.0 | 46.0 | 15.0 | 1,100 | 7.52 | 1,111 | 52.2 | 2.1 |
| 54 | Me:Co, 39.0 | 46.0 | 15.0 | 1,100 | 7.53 | 1,128 | 51.6 | 1.8 |
| 55 | Me:Mn, 39.0 | 46.0 | 15.0 | 1,100 | 7.55 | 1,129 | 51.3 | 1.5 |
| 56 | Me:Ni, 5.0 | 40.0 | 55.0 | 1,220 | 7.49 | 923 | 50.9 | 2.3 |
| 57 | Me:Co, 5.0 | 40.0 | 55.0 | 1,220 | 7.50 | 945 | 51.1 | 2.1 |
| 58 | Me:Mn, 5.0 | 40.0 | 55.0 | 1,220 | 7.48 | 964 | 50.7 | 2.0 |
| 59 | Me:Ni, 9.0 | 40.0 | 51.0 | 1,200 | 7.58 | 1,036 | 58.9 | 2.5 |
| 60 | Me:Co, 9.0 | 40.0 | 51.0 | 1,200 | 7.60 | 1,092 | 59.4 | 2.3 |
| 61 | Me:Mn, 9.0 | 40.0 | 51.0 | 1,200 | 7.59 | 1,061 | 58.2 | 2.2 |
| 62 | Me:Ni, 16.0 | 40.0 | 44.0 | 1,180 | 7.64 | 1,215 | 63.5 | 3.6 |
| 63 | Me:Co, 16.0 | 40.0 | 44.0 | 1,180 | 7.66 | 1,272 | 62.8 | 3.5 |
| 64 | Me:Mn, 16.0 | 40.0 | 44.0 | 1,180 | 7.67 | 1,300 | 63.7 | 3.3 |
| 65 | Me:Ni, 4.0<br>Me:Co, 8.0<br>Me:Mn, 4.0 | 40.0 | 44.0 | 1,180 | 7.70 | 1,328 | 64.6 | 3.1 |
| 66 | Me:Ni, 25.0 | 40.0 | 35.0 | 1,150 | 7.69 | 1,244 | 62.2 | 3.5 |
| 67 | Me:Co, 25.0 | 40.0 | 35.0 | 1,150 | 7.66 | 1,217 | 60.3 | 3.0 |
| 68 | Me:Mn, 25.0 | 40.0 | 35.0 | 1,150 | 7.67 | 1,263 | 61.1 | 2.9 |
| 69 | Me:Ni, 35.0 | 40.0 | 25.0 | 1,120 | 7.56 | 1,178 | 57.7 | 3.2 |
| 70 | Me:Co, 35.0 | 40.0 | 25.0 | 1,120 | 7.55 | 1,145 | 58.6 | 2.9 |
| 71 | Me:Mn, 35.0 | 40.0 | 25.0 | 1,120 | 7.57 | 1,171 | 59.1 | 2.6 |
| 72 | Me:Ni, 45.0 | 40.0 | 15.0 | 1,080 | 7.53 | 1,026 | 51.8 | 2.7 |
| 73 | Me:Co, 45.0 | 40.0 | 15.0 | 1,080 | 7.50 | 1,005 | 50.9 | 2.3 |
| 74 | Me:Mn, 45.0 | 40.0 | 15.0 | 1,080 | 7.52 | 1,060 | 51.3 | 2.1 |
| 75 | Me:Ni, 15.0<br>Me:Co, 15.0<br>Me:Mn, 15.0 | 40.0 | 15.0 | 1,080 | 7.55 | 1,100 | 52.2 | 2.0 |
| 76 | Me:Ni, 11.0 | 35.0 | 54.0 | 1,160 | 7.58 | 1,165 | 53.3 | 2.9 |
| 77 | Me:Co, 11.0 | 35.0 | 54.0 | 1,160 | 7.56 | 1,147 | 52.9 | 2.4 |
| 78 | Me:Mn, 11.0 | 35.0 | 54.0 | 1,160 | 7.56 | 1,186 | 53.5 | 2.2 |
| 79 | Me:Ni, 20.0 | 35.0 | 45.0 | 1,130 | 6.61 | 1,355 | 54.2 | 2.8 |
| 80 | Me:Co, 20.0 | 35.0 | 45.0 | 1,130 | 7.60 | 1,310 | 55.5 | 2.6 |
| 81 | Me:Mn, 20.0 | 35.0 | 45.0 | 1,130 | 7.61 | 1,383 | 54.9 | 2.5 |
| 82 | Me:Ni, 30.0 | 35.0 | 35.0 | 1,100 | 7.56 | 1,211 | 57.8 | 3.0 |
| 83 | Me:Co, 30.0 | 35.0 | 35.0 | 1,100 | 7.57 | 1,283 | 58.5 | 3.0 |
| 84 | Me:Mn, 30.0 | 35.0 | 35.0 | 1,100 | 7.55 | 1,245 | 57.4 | 2.7 |
| 85 | Me:Ni, 40.0 | 35.0 | 25.0 | 1,060 | 7.53 | 1,072 | 54.6 | 2.6 |
| 86 | Me: Co, 40.0 | 35.0 | 25.0 | 1,060 | 7.55 | 1,094 | 53.8 | 2.3 |
| 87 | Me:Mn, 40.0 | 35.0 | 25.0 | 1,060 | 7.52 | 1,033 | 53.0 | 2.1 |
| 88 | Me:Ni, 50.0 | 35.0 | 15.0 | 1,020 | 7.50 | 924 | 50.7 | 1.9 |
| 89 | Me:Co, 50.0 | 35.0 | 15.0 | 1,020 | 7.49 | 896 | 50.4 | 1.5 |
| 90 | Me:Mn, 50.0 | 35.0 | 15.0 | 1,020 | 7.51 | 901 | 50.3 | 1.0 |
| 91 | Me:Ni, 10.0<br>Me:Co, 20.0<br>Me:Mn, 20.0 | 35.0 | 15.0 | 1,020 | 7.52 | 948 | 51.0 | 1.6 |
| 92 | Me:Ni, 20.0 | 30.0 | 50.0 | 1,120 | 7.58 | 1,156 | 50.6 | 1.8 |
| 93 | Me:Co, 20.0 | 30.0 | 50.0 | 1,120 | 7.57 | 1,183 | 51.1 | 1.5 |
| 94 | Me:Ni, 20.0 | 30.0 | 50.0 | 1,120 | 7.59 | 1,199 | 51.2 | 0.9 |
| 95 | Me:Ni, 30.0 | 30.0 | 40.0 | 1,080 | 7.54 | 1,068 | 53.5 | 2.2 |
| 96 | Me:Co, 30.0 | 30.0 | 40.0 | 1,080 | 7.52 | 1,091 | 52.9 | 2.3 |
| 97 | Me:Mn, 30.0 | 30 0 | 40.0 | 1,080 | 7.55 | 1,047 | 52.4 | 2.0 |
| 98 | Me:Ni, 40.0 | 30.0 | 30.0 | 1,040 | 7.50 | 91.2 | 52.3 | 1.8 |
| 99 | Me:Co, 40.0 | 30.0 | 30.0 | 1,040 | 7.48 | 901 | 52.0 | 1.3 |
| 100 | Me:Mn, 40.0 | 30.0 | 30.0 | 1,040 | 7.49 | 935 | 51.9 | 1.0 |
| 101 | Me:Ni, 50.0 | 30.0 | 20.0 | 1,000 | 7.46 | 866 | 51.0 | 1.4 |
| 102 | Me:Co, 50.0 | 30.0 | 20.0 | 1,000 | 7.45 | 874 | 50.3 | 1.0 |
| 103 | Me:Mn, 50.0 | 30.0 | 20.0 | 1,000 | 7.43 | 891 | 50.0 | 0.7 |
| 104 | Me:Ni, 40.0<br>Me:Co, 10.0 | 30.0 | 20.0 | 1,000 | 7.46 | 899 | 50.8 | 0.9 |
| 105 | Me:Co, 40.0<br>Me:Mn,10.0 | 30.0 | 20.0 | 1,000 | 7.47 | 908 | 51.1 | 1.1 |
| Reference: | | | | | | | | |
| 6 | Me:Ni, 15.0 | 29.0 | 56.0 | 1,140 | 7.44 | 1,022 | 48.8 | 5.4 |
| 7 | Me:Co, 15.0 | 29.0 | 56.0 | 1,140 | 7.40 | 1,006 | 49.1 | 6.2 |
| 8 | Me:Mn, 15.0 | 29.0 | 56.0 | 1,140 | 7.40 | 1,071 | 49.3 | 5.6 |

When a determination was made of change with temperature in the dielectric constant of Example 24 (Curie point 330° C.) and Example 49 (Curie point 300° C.), the curves of FIG. 7 were obtained. The curve 24 represents Example 24 and the curve 49 Example 49. When determination was made of change with temperature in the electro-mechanical coupling coefficient $K_{33}$ of said Examples 24 and 49, the curves of FIG. 8, were obtained, illustrating that there was only a small change in the electro-mechanical coupling coefficient $K_{33}$ over a temperature range of −100° to 200° C. due to the high Curie point, enabling $K_{33}$ to be used at a fully high level under stable condition. Referring to FIG. 8, the curve 24 denotes Example 24 and the curve 49 Example 49.

There were prepared ignition units from piezoelectric materials having the compositions of Examples 9, 40, 48 and 71. When a determination was made of change in the voltage generated by said units, the values reported in Table 2 were obtained. Table 2, also gives the results of tests conducted for the voltage generation of other ignition units prepared from the prior art piezoelectric material (Reference A) having the composition $$Pb(Ti_{0.47}Zr_{0.53})O_3+1.0 \text{ wt. percent } Nb_2O_5$$

TABLE 2

| Sample | Number of impacts: 1st time (kv.) | 1,000th time (kv.) | 10,000th time (kv.) | 100,000th time (kv.) | Millionth time (kv.) | Decrease of voltage (percent) |
|---|---|---|---|---|---|---|
| Example: | | | | | | |
| 9 | 14.3 | 14.1 | 14.0 | 14.0 | 13.9 | 2.8 |
| 40 | 15.7 | 15.5 | 15.3 | 15.2 | 15.1 | 3.8 |
| 48 | 15.6 | 15.5 | 15.4 | 15.3 | 15.2 | 2.6 |
| 71 | 15 1 | 15.0 | 14.9 | 14.7 | 14.6 | 3.3 |
| Reference A | 15.5 | 15.0 | 14.3 | 13.7 | 13.0 | 15.6 |

Table 2 also proves that the piezoelectric materials of this invention have excellent properties.

When there was performed a durability test by repeatedly subjecting the samples to a pressure of 1 ton/cm.² to determine the deterioration of the electro-mechanical coupling coefficient $K_{33}$, there were obtained the results of FIG. 9. As seen from FIG. 9, Examples 23, 43 and 88 only exhibited a maximum of 10% decline in $K_{33}$, whereas the prior art piezoelectric materials (Reference B) having a composition $[Pb(Ti_{0.46}Zr_{0.54})O_3+0.7$ wt. percent $Nb_2O_5]$ and (Reference C) having a composition $[Pb(Ti_{0.47}Zr_{0.53})O_3+0.8$ wt. percent $Nb_2O_5]$ exhibited a decrease in $K_{33}$ several times as large. Referring to FIG. 9, the curve 23 denotes Example 23, the curve 43 Example 43, and curve 88 Example 88, the curve B Reference B and curve C Reference C.

(II) Examples of basic piezoelectric oxide materials of this invention wherein part of the Pb included therein was substituted by Ba, Sr and Ca respectively.

There were provided starting materials such as oxides of Pb, Ti, Zr, Mn, Co, Ni, Ba, Sr and Ca having a chemical purity of at least 98% or, for example, carbonates thereof, which could be converted to oxides upon heating. All these raw materials were accurately weighed out to obtain the compositions given in Table 3 below. They were pulverized into powders controlled to a particle size of 1 to 2 microns, obtaining 61 examples and 3 reference samples. After being treated in the same manner as in Example I, the samples were formed into discs 1 mm. thick and 13 mm. in diameter and rods 15 mm. long and 7 mm. in diameter. Using the same method applied in Example I, the specific gravity of the discs was measured. The dielectric constant of said discs and rods were determined by attaching electrodes thereto. After polarization, all these samples were tested for piezoelectric properties. Table 3 gives the results of said test and also the deterioration of the electro-mechanical coupling coefficient $K_{33}$ of said samples after being subjected to a million in impact repetitions strong enough to generate 15 to 18 kv.

TABLE 3

| Sample | $Pb_{1-\alpha}Me'_{\alpha}[(Me_{1/2}Te_{1/2})_xTi_yZr_z]O_3$: α (atom percent) | X (mol percent) | Y (mol percent) | Z (mol percent) | F. T. (° C.) | D | ε | $K_{33}$ (percent) | Decrease of $K_{33}$ (percent) |
|---|---|---|---|---|---|---|---|---|---|
| Example: | | | | | | | | | |
| 106 | Me':Ba, 0.3. | Me:Mn, 0.5. | 60.0 | 39.5 | 1,260 | 7.63 | 997 | 50.9 | 2.8 |
| 107 | Me':Sr, 0.3. | Me:Ni, 0.5. | 60.0 | 39.5 | 1,260 | 7.65 | 1,011 | 51.3 | 3.0 |
| 108 | Me':Ca, 0.3. | Me:Co, 0.5. | 60.0 | 39.5 | 1,260 | 7.62 | 984 | 50.8 | 2.6 |
| 109 | Me':Ba, 10.0. | Me:Co, 0.5. | 60.0 | 39.5 | 1,260 | 7.68 | 2,003 | 53.1 | 2.2 |
| 110 | Me':Sr, 10. 0. | Me:Mn, 0.5. | 60.0 | 39.5 | 1,260 | 7.67 | 1,896 | 54.0 | 2.0 |
| 111 | Me':Ca, 10,0. | Me:Ni, 0.5. | 60.0 | 39.5 | 1,260 | 7.70 | 1,917 | 53.5 | 1.8 |
| 112 | Me':Ba, 20.0. | Me:Ni, 0.5. | 60.0 | 39.5 | 1,260 | 7.65 | 2,841 | 51.2 | 2.5 |
| 113 | Me':Sr, 20.0. | Me:Co, 0.5. | 60.0 | 39.5 | 1,260 | 7.66 | 2,533 | 51.7 | 2.4 |
| 114 | Me':Ca, 20.0. | Me:Mn, 0.5. | 60.0 | 39.5 | 1,260 | 7.64 | 2,474 | 50.8 | 2.7 |
| 115 | Me':Ba, 5.0. | Me:Mn, 10.0. | 60.0 | 30.0 | 1,240 | 7.70 | 1,429 | 53.9 | 2.0 |
| 116 | Me':Sr, 15.0. | Me:Co, 10.0. | 60.0 | 30.0 | 1,240 | 7.73 | 2,536 | 54.0 | 2.3 |
| 117 | Me':Ca, 20.0. | Me:Ni, 10.0. | 60.0 | 30.0 | 1,240 | 7.69 | 3,152 | 51.6 | 3.0 |
| 118 | Me':Sr, 5.0. | Me:Mn, 10.0. | 50.0 | 40.0 | 1,230 | 7.75 | 1,865 | 68.8 | 2.2 |
| 119 | Me':Ca, 10.0. | Me:Ni, 10.0. | 50.0 | 40.0 | 1,230 | 7.76 | 2,018 | 70.0 | 1.9 |
| 120 | Me':Ba, 15.0. | Me:Co, 10.0. | 50.0 | 40.0 | 1,230 | 7.77 | 3,107 | 65.7 | 1.1 |
| 121 | Me:Ca, 10.0. Me':Ba, 10.0. | Me:Ni, 10.0. | 50.0 | 40.0 | 1,230 | 7.71 | 2,263 | 55.0 | 2.7 |
| 122 | Me':Ba, 5.0. | Me:Co, 10.0. | 46.0 | 44.0 | 1,220 | 7.74 | 1,992 | 73.5 | 2.0 |
| 123 | Me':Sr, 9.0. | Me:Mn, 10.0. | 45.0 | 45.0 | 1,220 | 7.82 | 2,264 | 81.1 | 1.3 |
| 124 | Me':Ca, 9.0. | Me:Ni, 10.0. | 40.0 | 50.0 | 1,220 | 7.75 | 2,130 | 74.6 | 1.2 |
| 125 | Me':Ba, 13.0. | Me:Co, 10.0. | 40.0 | 50.0 | 1,220 | 7.78 | 2,766 | 75.1 | 0.6 |
| 126 | Me':Sr, 19.0. | Me:Mn, 10.0. | 35.0 | 55.0 | 1,220 | 7.68 | 2,341 | 54.3 | 2.2 |
| 127 | Me':Ca, 9.0. Me':Ba, 10.0. | Me:Mn, 5.0. Me:Co, 5.0. | 35.0 | 55.0 | 1,220 | 7.66 | 2,574 | 55.0 | 2.0 |

TABLE 3—Continued

| Sample | $Pb_{1-\alpha}Me'_{\alpha}[(Me_{1/2}Te_{1/2})_xTi_yZr_z]O_3$ α (atom percent) | X (mol percent) | Y (mol percent) | Z (mol percent) | F. T. (° C.) | D | ε | $K_{33}$ (percent) | Decrease of $K_{33}$ (percent) |
|---|---|---|---|---|---|---|---|---|---|
| 128 | Me':Sr, 9.0.<br>Me':Ca, 10.0. | Me:Ni, 5.0.<br>Me:Mn, 5.0. | 35.0 | 55.0 | 1,220 | 7.65 | 2,422 | 56.2 | 1.8 |
| 129 | Me':Ba, 0.2. | Me:Mn, 20.0. | 60.0 | 20.0 | 1,190 | 7.68 | 1,476 | 52.0 | 2.5 |
| 130 | Me':Sr, 10.0. | Me:Ni, 20.0. | 60.0 | 20.0 | 1,190 | 7.70 | 1,642 | 53.0 | 2.1 |
| 131 | Me':Ca, 10.0. | Me:Co, 20.0. | 60.0 | 20.0 | 1,190 | 7.77 | 2,891 | 57.1 | 2.0 |
| 132 | Me':Sr, 20.0. | Me:Ni, 20.0. | 60.0 | 20.0 | 1,190 | 7.66 | 3,563 | 51.2 | 2.9 |
| 133 | Me':Ba, 5.0. | Me:Mn, 20.0. | 50.0 | 30.0 | 1,180 | 7.72 | 1,893 | 65.6 | 2.4 |
| 134 | Me':Sr, 10.0. | Me:Co, 20.0. | 50.0 | 30.0 | 1,180 | 7.75 | 2,642 | 74.4 | 1.8 |
| 135 | Me':Ca, 14.0. | Me:Ni, 20.0. | 50.0 | 30.0 | 1,180 | 7.80 | 3,130 | 78.3 | 1.5 |
| 136 | Me:'Ba, 7.0.<br>Me:Sr, 7.0. | Me:Ni, 10.0.<br>Me:Co, 10.0. | 50.0 | 30.0 | 1,180 | 7.82 | 3,354 | 79.0 | 1.3 |
| 137 | Me':Ca, 20.0. | Me:Mn. 20.0. | 50.0 | 30.0 | 1,180 | 7.69 | 4,142 | 53.8 | 2.7 |
| 138 | Me':Ba, 5.0. | Me:Co, 20.0. | 46.0 | 34.0 | 1,180 | 7.75 | 2,000 | 81.1 | 1.8 |
| 139 | Me'/Sr, 11.0. | Me/Ni, 20.0. | 40.0 | 40.0 | 1,180 | 7.80 | 2,417 | 69.3 | 1.0 |
| 140 | Me'/Ca, 15.0. | Me/Co, 20.0. | 30.0 | 50.0 | 1,180 | 7.68 | 1,866 | 55.3 | 2.8 |
| 141 | Me'/Ba, 5.0.<br>Me'/Sr, 5.0.<br>Me'/Ca, 5.0. | Me/Mn, 10.0.<br>Me/Co, 5.0.<br>Me/Ni, 5.0. | 30.0 | 50.0 | 1,180 | 7.70 | 2,032 | 56.1 | 2.4 |
| 142 | Me':Ba, 1.0 | Me:Co, 30.0 | 55.0 | 15.0 | 1,150 | 7.61 | 1,238 | 51.3 | 2.9 |
| 143 | Me':Sr, 10.0 | Me:Co, 30.0 | 55.0 | 15.0 | 1,150 | 7.68 | 2,217 | 55.2 | 2.1 |
| 144 | Me':Ca, 20.0 | Me:Ni, 30.0 | 55.0 | 15.0 | 1,150 | 7.64 | 2,963 | 52.0 | 2.7 |
| 145 | Me':Sr, 7.0 | Me:Mn, 30.0 | 50.0 | 20.0 | 1,150 | 7.71 | 2,124 | 64.7 | 1.3 |
| 146 | Me':Ba, 14.0 | Me:Co, 30.0 | 50.0 | 20.0 | 1,150 | 7.73 | 2,739 | 70.5 | 0.9 |
| 147 | Me':Ca, 18.0 | Me:Ni, 30.0 | 50.0 | 20.0 | 1,150 | 7.69 | 2,520 | 66.2 | 1.2 |
| 148 | Me':Sr, 2.0 | Me:Mn, 30.0 | 45.0 | 25.0 | 1,150 | 7.72 | 1,926 | 71.1 | 1.5 |
| 149 | Me':Ca, 15.0 | Me:Co, 30.0 | 45.0 | 25.0 | 1,150 | 7.75 | 2,788 | 68.3 | 1.7 |
| 150 | Me':Ba, 10.0 | Me:Mn, 30.0 | 40.0 | 30.0 | 1,150 | 7.63 | 2,531 | 63.6 | 1.0 |
| 151 | Me':Sr, 10.0 | Me:Ni, 30.0 | 40.0 | 30.0 | 1,150 | 7.65 | 2,468 | 64.4 | 0.8 |
| 152 | Me':Ca, 10.0 | Me:Co, 30.0 | 35.0 | 35.0 | 1,150 | 7.61 | 2,035 | 60.0 | 1.5 |
| 153 | Me':Sr, 10.0 | Me:Co, 30.0 | 30.0 | 40.0 | 1,150 | 7.58 | 1,586 | 53.2 | 2.1 |
| 154 | Me':Ca, 3.0<br>Me':Sr, 3.0<br>Me':Ba, 4.0 | Me:Co, 10.0<br>Me:Mn, 10.0<br>Me:Ni, 10.0 | 30.0 | 40.0 | 1,150 | 7.60 | 1,600 | 54.1 | 2.0 |
| 155 | Me':Ba, 6.0 | Me:Mn, 40.0 | 45.0 | 15.0 | 1,100 | 7.59 | 1,842 | 61.9 | 2.4 |
| 156 | Me':Sr, 10.0 | Me:Ni, 40.0 | 45.0 | 15.0 | 1,100 | 7.64 | 2,208 | 64.2 | 1.9 |
| 157 | Me':Ca, 15.0 | Me:Co, 40.0 | 45.0 | 15.0 | 1,100 | 7.66 | 2,614 | 62.8 | 2.0 |
| 158 | Me':Ba, 8.0 | Me:Co, 40.0 | 40.0 | 20.0 | 1,100 | 7.70 | 2,023 | 65.3 | 1.5 |
| 159 | Me':Sr, 16.0 | Me:Mn, 40.0 | 40.0 | 20.0 | 1,100 | 7.68 | 1,932 | 58.7 | 2.2 |
| 160 | Me':Ca, 12.0 | Me:Ni, 40.0 | 35.0 | 25.0 | 1,100 | 7.64 | 1,707 | 55.9 | 2.5 |
| 161 | Me':Sr, 12.0 | Me:Mn, 40.0 | 35.0 | 25.0 | 1,100 | 7.65 | 1,864 | 56.6 | 2.3 |
| 162 | Me':Ca, 12.0 | Me:Co, 40.0 | 30.0 | 30.0 | 1,100 | 7.59 | 1,526 | 54.3 | 2.9 |
| 163 | Me':Ba, 6.0<br>Me':Sr, 6.0 | Me:Mn, 20.0<br>Me:Co, 20.0 | 30.0 | 30.0 | 1,100 | 7.60 | 1,439 | 55.0 | 2.7 |
| 164 | Me':St, 7.0 | Me:Co, 50.0 | 35.0 | 15.0 | 1,060 | 7.64 | 1,824 | 56.3 | 2.1 |
| 165 | Me':Ca, 10.0 | Me:Ni, 50.0 | 30.0 | 20 0 | 1,060 | 7.59 | 1,481 | 54.2 | 2.6 |
| 166 | Me':Ba, 20.0 | Me:Ni, 50.0 | 30.0 | 20.0 | 1,060 | 7.55 | 1,348 | 51.2 | 3.0 |
| Reference: | | | | | | | | | |
| 9 | Me':Sr, 10.0 | Me:Co, 50.0 | 25.0 | 25.0 | 1,050 | 7.50 | 1,911 | 48.8 | 5.6 |
| 10 | Me':Ca, 20.0 | Me:Co, 50.0 | 40.0 | 10.0 | 1,050 | 7.49 | 2,344 | 49.1 | 6.5 |
| 11 | Me':Ba, 25.0 | Me:Co, 40.0 | 40.0 | 20.0 | 1,080 | 7.51 | 2,846 | 49.6 | 7.3 |

When a determination was made of the change with temperature of the dielectric constant of Example 129 (Curie point 330° C.) and Example 151 (Curie point 290° C.), of FIG. 10 the curves were obtained. The curve 129 represents Example 129 and the cure 151 Example 151. When a determination was made of change with temperature of the electro-mechanical coupling coefficient $K_{33}$ of both Examples 129 and 151, the curves of FIG. 11 were obtained. They indicated little change in the electro-mechanical coupling coefficient $K_{33}$ over a temperature range of −100° to 200° C. due to high Curie point, enabling $K_{33}$ to be used at a fully high level under stable condition. Referring to FIG. 11, the curve 129 denotes Example 129 and the cure 151 Example 151.

Ignition units were prepared from piezoelectric materials having the compositions of Examples 114, 136, 149 and 165. When a determination was made of the change in the voltage generated by said units, there was obtained the results reported in Table 4 below, which shows that the ignition units formed of the piezoelectric material of this invention exhibited a far smaller decrease in the voltage generated than did the Reference A of Table 2.

TABLE 4

| Sample | Number of impacts: 1st time (kv.) | 1,000th time (kv.) | 10,000th time (kv.) | 100,000th time (kv.) | Millionth time (kv.) | Decrease of voltage (percent) |
|---|---|---|---|---|---|---|
| Example: | | | | | | |
| 114 | 15.6 | 15.5 | 15.5 | 15.3 | 15.2 | 2.6 |
| 136 | 17.2 | 17.1 | 17.0 | 17.0 | 17.0 | 1.2 |
| 149 | 16.5 | 16.4 | 16.3 | 16.2 | 16.2 | 1.8 |
| 165 | 15.8 | 15.7 | 15.6 | 15.5 | 15.4 | 2.4 |

Table 4 also indicates that the piezoelectric oxide material of this invention had excellent properties.

When a durability test was conducted by repeatedly subjecting the samples to a pressure of 1 ton/cm.$^2$ to determine the change in the electro-mechanical coupling coefficient $K_{33}$, the curves the tendency of FIG. 12 were obtained. Examples 128, 148 and 164 only showed a maximum of 10% in $K_{33}$. Referring to FIG. 12, the curve 128 denotes Example 128, the curve 148 Example 148 and the curve 164 Example 164. For comparison, there are set forth again in Table 2 the properties of References B and C of FIG. 9.

As apparent from the foregoing description, the piezoelectric oxide materials of this invention have excellent properties which vary only very slightly as confirmed by the temperature and durability tests, and provide good performance as a transducer element in piezoelectric ignition, thus offering many industrial advantages.

What we claim is:

1. Ternary piezoelectric oxide materials having a composition expressed as $$XPb(Me_{1/2}Te_{1/2})O_3—YPbTiO_3—ZPbZrO_3$$

where:

Me=at least one metal selected from the group of Ni, Co and Mn
X=0.5 to 50.0 mol percent
Y=30.0 to 60.0 mol percent
Z=15.0 to 55.0 mol percent
X+Y+Z=100 mol percent

2. A piezoelectric oxide material according to claim 1 wherein up to 20.0 atom percent of the Pb is replaced by at least one element selected from the group of Ba, Sr and Ca.

References Cited

UNITED STATES PATENTS

| | | | |
|---|---|---|---|
| 3,268,453 | 8/1966 | Ouchi et al. | 252—62.9 |
| 3,309,168 | 3/1967 | Bayer | 252—62.9 X |
| 3,463,732 | 8/1969 | Banno et al. | 252—62.9 |
| 3,468,799 | 9/1969 | Kurihara et al. | 252—62.9 |
| 3,533,950 | 10/1970 | Tsubouchi et al. | 252—62.9 |
| 3,544,470 | 12/1970 | Tsubouchi et al. | 252—62.9 |

OTHER REFERENCES

Bayer: "Journal of the American Ceramic Society," vol. 46, No. 12, December 1963, pp. 604–5.

TOBIAS E. LEVOW, Primary Examiner

J. COOPER, Assistant Examiner

U.S. Cl. X.R.

106—39 R